(12) United States Patent
Andarawis et al.

(10) Patent No.: US 8,177,474 B2
(45) Date of Patent: May 15, 2012

(54) SYSTEM AND METHOD FOR TURBINE ENGINE CLEARANCE CONTROL WITH RUB DETECTION

(75) Inventors: Emad Andarawis Andarawis, Ballston Lake, NY (US); William Lee Herron, Cincinnati, OH (US); Samhita Dasgupta, Niskayuna, NY (US); John Harry Down, Lanesboro, MA (US); Mahadevan Balasubramaniam, Ballston Lake, NY (US); David So Keung Chan, Niskayuna, NY (US); David Walter Parry, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 1358 days.

(21) Appl. No.: 11/768,211

(22) Filed: Jun. 26, 2007

(65) Prior Publication Data
US 2009/0003991 A1    Jan. 1, 2009

(51) Int. Cl.
*F01D 11/20* (2006.01)
*F01D 11/22* (2006.01)
*F01D 11/24* (2006.01)

(52) U.S. Cl. ............... 415/1; 415/13; 415/14; 415/118; 415/173.1; 415/173.2; 415/173.4; 416/61; 324/662; 324/683; 324/686

(58) Field of Classification Search ............... 415/1, 13, 415/14, 118, 173.1–173.5; 416/1, 31, 61; 324/662, 683, 686
See application file for complete search history.

(56) References Cited

U.S. PATENT DOCUMENTS

| | | | |
|---|---|---|---|
| 3,074,351 | A | 1/1963 | Foster |
| 4,049,349 | A | 9/1977 | Wennerstrom |
| 4,818,948 | A | 4/1989 | Dooley |
| 4,823,071 | A | 4/1989 | Ding et al. |
| 4,928,089 | A | 5/1990 | Gasiunas et al. |
| 4,987,555 | A | 1/1991 | Twerdochlib |
| 5,070,302 | A | 12/1991 | Marcus et al. |
| 5,101,165 | A | 3/1992 | Rickards |
| 5,119,036 | A | 6/1992 | Rickards et al. |

(Continued)

FOREIGN PATENT DOCUMENTS
DE    4119244    12/1992

OTHER PUBLICATIONS

U.S. Patent Application, E.A. Andarawis et al., "Clearance Measurement Systems and Methods of Operation," U.S. Appl. No. 11/229,251, filed Sep. 16, 2005.

(Continued)

*Primary Examiner* — Christopher Verdier
(74) *Attorney, Agent, or Firm* — Penny A. Clarke

(57) ABSTRACT

A method of detecting rubs during operation of a turbomachine comprising at least one rotating object having a tip and a shelf is provided. The method includes generating signals representative of a sensed parameter and processing the signals to generate height versus time data for the tip. The height of the tip corresponds to the distance between the tip and the shelf. The method further includes monitoring the height versus time data, in order to determine whether a change in the height data exceeds a threshold value, and detecting a rub of the rotating object(s) on a second object, when the change in the height data exceeds the threshold value. A rub detection system for a turbomachine and a turbine engine system with rub detection are also provided.

28 Claims, 11 Drawing Sheets

U.S. PATENT DOCUMENTS

| | | | |
|---|---|---|---|
| 5,166,626 | A | 11/1992 | Hester et al. |
| 5,616,009 | A | 4/1997 | Birdwell |
| 5,910,781 | A | 6/1999 | Kawamoto et al. |
| 5,990,807 | A | 11/1999 | Cloutier et al. |
| 6,401,460 | B1 * | 6/2002 | Xia .................................. 415/14 |
| 6,401,541 | B1 | 6/2002 | Kurtz |
| 6,441,623 | B1 | 8/2002 | Moon |
| 6,593,755 | B1 | 7/2003 | Rosengren |
| 6,594,555 | B2 | 7/2003 | Steingraeber |
| 6,717,418 | B2 | 4/2004 | Orenstein |
| 6,744,264 | B2 | 6/2004 | Gogoi et al. |
| 6,785,635 | B2 | 8/2004 | von Flotow |
| 6,848,193 | B1 | 2/2005 | Kirzhner |
| 6,876,209 | B2 | 4/2005 | Lin et al. |
| 7,180,305 | B2 | 2/2007 | Andarawis et al. |
| 7,215,129 | B1 | 5/2007 | Andarawis et al. |
| 7,333,913 | B2 * | 2/2008 | Andarawis et al. ............ 702/158 |
| 7,431,557 | B2 | 10/2008 | Herron et al. |
| 7,891,938 | B2 * | 2/2011 | Herron et al. ..................... 415/1 |
| 2003/0011378 | A1 | 1/2003 | Ishio et al. |
| 2003/0215323 | A1 | 11/2003 | Prinz et al. |
| 2004/0158980 | A1 | 8/2004 | Nakatani et al. |
| 2004/0265488 | A1 | 12/2004 | Hardwicke et al. |
| 2005/0052268 | A1 | 3/2005 | Pleskach et al. |
| 2005/0077911 | A1 | 4/2005 | Miyasaka |
| 2005/0103112 | A1 | 5/2005 | Pedersen et al. |
| 2006/0006960 | A1 | 1/2006 | Lin et al. |
| 2006/0066318 | A1 | 3/2006 | Andarawis et al. |
| 2006/0103003 | A1 | 5/2006 | Heide et al. |
| 2006/0125492 | A1 | 6/2006 | Andarawis et al. |
| 2006/0132147 | A1 | 6/2006 | Balasubramaniam et al. |
| 2007/0043497 | A1 | 2/2007 | Leogrande et al. |
| 2009/0064522 | A1 | 3/2009 | Herron et al. |

OTHER PUBLICATIONS

U.S. Patent Application, M. Balasubramaniam et al., "System and Method for Measuring Clearance Between Two Objects," U.S. Appl. No. 11/015,258, filed Dec. 17, 2004.

U.S. Patent Application, E.A. Andarawis et al., "A Sensor System and Method of Operating the Same," U.S. Appl. No. 10/951,562, filed Sep. 28, 2004.

U.S. Patent Application, J. A. Ruud et al, "Sensor Assembly, Transformers and Methods of Manufacture," U.S. Appl. No. 11/528,236, filed Sep. 27, 2006.

U.S. Patent Application, M. A. Shah et al., "Displacement Sensor System and Method of Operation," U.S. Appl. No. 11/115,736, filed Apr. 26, 2005.

U.S. Patent Application, S. Dasgupta et al., "Multi-Range Clearance Measurement System and Method of Operation," U.S. Appl. No. 11/295,362, filed Dec. 6, 2005.

U.S. Patent Application, E. A. Andarawis et al., "Clearance Measurement System and Method of Operation," U.S. Appl. No. 11/167,434, filed Jun. 6, 2005.

E.J. Brandon et al, "Printed Microinductors on Flexible substrates for Power Applications," IEEE Transactions on Components and packaging Technologies, vol. 26, No. 3, Sep. 2003, pp. 517-523.

DE4119244, English Abstract.

M. Drumm et al., "High Performance Rotor Health Monitoring," IEEE 0-7803-6395-7, 2000, pp. 6. E.4-1-6.E.4-8.

A. von Flotow et al., "Health Monitoring and Prognostics of Blades and Disks with Blade Tip Sensors," IEEE 0-7803-5846-5, 2000, pp. 433-440.

* cited by examiner

SYSTEM AND METHOD FOR TURBINE ENGINE CLEARANCE CONTROL WITH RUB DETECTION

BACKGROUND

The invention relates generally to active clearance control for turbomachinery and, more particularly, to rub detection for turbine engines.

In a turbine engine or other such rotating machinery, the clearance (gap) between the blades and the shroud is an important design and operational parameter of the engine. For aircraft engines, during different parts of the flight cycle, various thermal and mechanical effects lead to the gap changing. In some of these instances, that change is not uniform across the shroud or around the circumference of the engine.

Modern engines incorporate active clearance control systems to minimize these changes. Clearances are traditionally controlled using an analytic model with a built in safety margin to avoid rubs. Such models are necessarily very conservative, resulting in a less than optimal demand clearance.

In systems employing a clearance sensor, eccentricities in the clearance can result in the sensor measuring a positive clearance number, even when a rub has occurred elsewhere around the engine. Thus, for a system in which an active clearance control strategy is employed, this would result in the control driving the clearance to smaller values, even in the case where a pinch point exists and a rub has occurred. If this situation occurs, then the clearance control system runs the risk of rubbing away a substantial portion of the blade squealer tips to the point that subsequent closure of the clearance becomes impossible. However, for systems in which a clearance/displacement sensor is employed, it would be possible to do a rudimentary rub avoidance, through the use of a safety margin, in conjunction with the clearance measurement system, in order to account for some rotor or shroud eccentricities. This approach, however, lacks the desired sensitivity and precision needed for accurate control of clearances.

It would therefore be desirable to provide a clearance control method and system using clearance sensor data for rub detection. It would further be desirable for the clearance control method and system to provide enhanced sensitivity and accuracy for rub detection, so that active clearance control strategies could be beneficially employed.

BRIEF DESCRIPTION

Briefly, one aspect of the present invention resides in a method of detecting rubs during operation of a turbomachine comprising at least one rotating object having a tip and a shelf. The method includes generating signals representative of a sensed parameter and processing the signals to generate height versus time data for the tip. The height of the tip corresponds to the distance between the tip and the shelf. The method further includes monitoring the height versus time data in order to determine whether a change in the height data exceeds a threshold value and detecting a rub of the rotating object(s) on a second object, when the change in the height data exceeds the threshold value.

Another aspect of the invention resides in a rub detection system for a turbomachine comprising at least one rotating object having a tip and a shelf. The system includes at least one sensor configured to generate signals representative of a sensed parameter corresponding to the rotating object(s) at a number of times. The system further includes a processor configured to evaluate the signals to generate height versus time data for the tip. The processor is further configured to monitor the height versus time data, in order to determine whether a change in the height data exceeds a threshold value, and to output a rub detection signal when the change in the height data exceeds the threshold value. The system further includes a controller configured to receive the rub detection signal.

Yet another aspect of the invention resides in a turbine engine system with rub detection. The turbine engine system includes a plurality of rotating components, each rotating component having a tip and a shelf. The turbine engine system further includes a stationary component spaced apart from the rotating components and at least one sensor configured to generate signals representative of a sensed parameter corresponding to the rotating components at a number of times. The turbine engine system further includes a processor configured to evaluate the signals to generate height versus time data for the tip. The processor is further configured to monitor the height versus time data, in order to determine whether a change in the height data exceeds a threshold value, and output a rub detection signal when the change in the height data exceeds the threshold value. The turbine engine system further includes a controller configured to receive the rub detection signal.

DRAWINGS

These and other features, aspects, and advantages of the present invention will become better understood when the following detailed description is read with reference to the accompanying drawings in which like characters represent like parts throughout the drawings, wherein:

FIG. 1 schematically depicts an example squealer tip of an example turbine blade with a first probe tip in a forward position and a second probe tip in a setback position;

DETAILED DESCRIPTION

Figure 1:
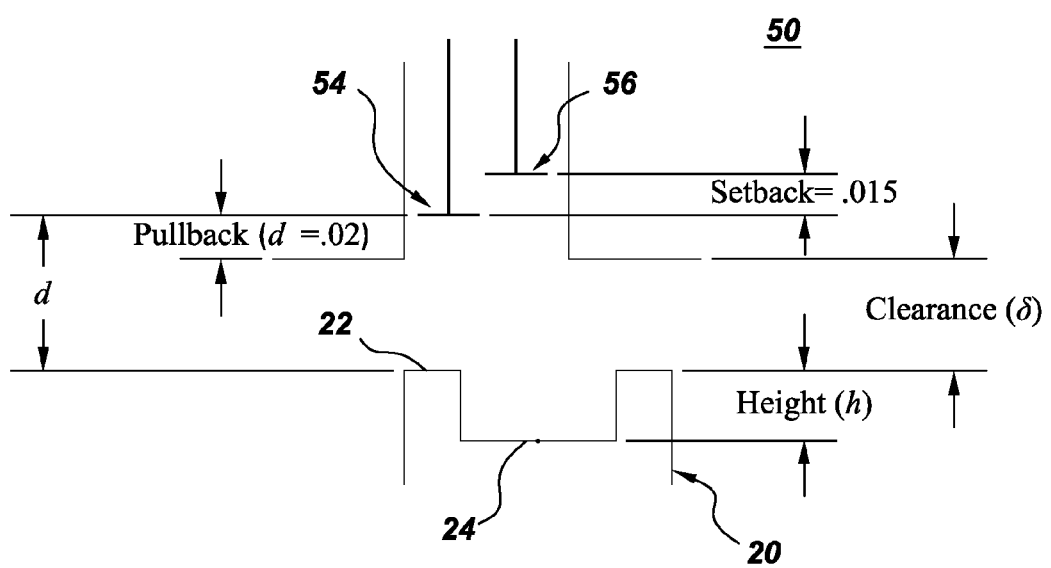

A rub detection system 50 embodiment of the invention is described with reference to FIGS. 1-7. The turbomachine 10 includes at least one rotating object 20 having a tip 22 and a shelf 24. Nonlimiting examples of turbomachines include aircraft engines, power generation turbines, turbochargers for locomotive engines, compressors and oil and gas pumping units. In one example, the turbomachine is an aircraft engine or a turbine stage thereof, and the rotating object 20 is a turbine blade 20. For example, the turbomachine is a high-pressure turbine stage of a turbine engine, and the rotating object is a high pressure turbine blade. FIG. 1 schematically depicts an example "squealer tip" 22 of an example turbine blade. As indicated in FIG. 1, the tip 22 extends from the blade shelf 24 and the distance between the tip 22 and the shelf 24 is the tip or squealer height h. The dimensions given in the figures and text are merely examples, and the invention is not limited to any specific part dimensions or part design.

Figure 3:
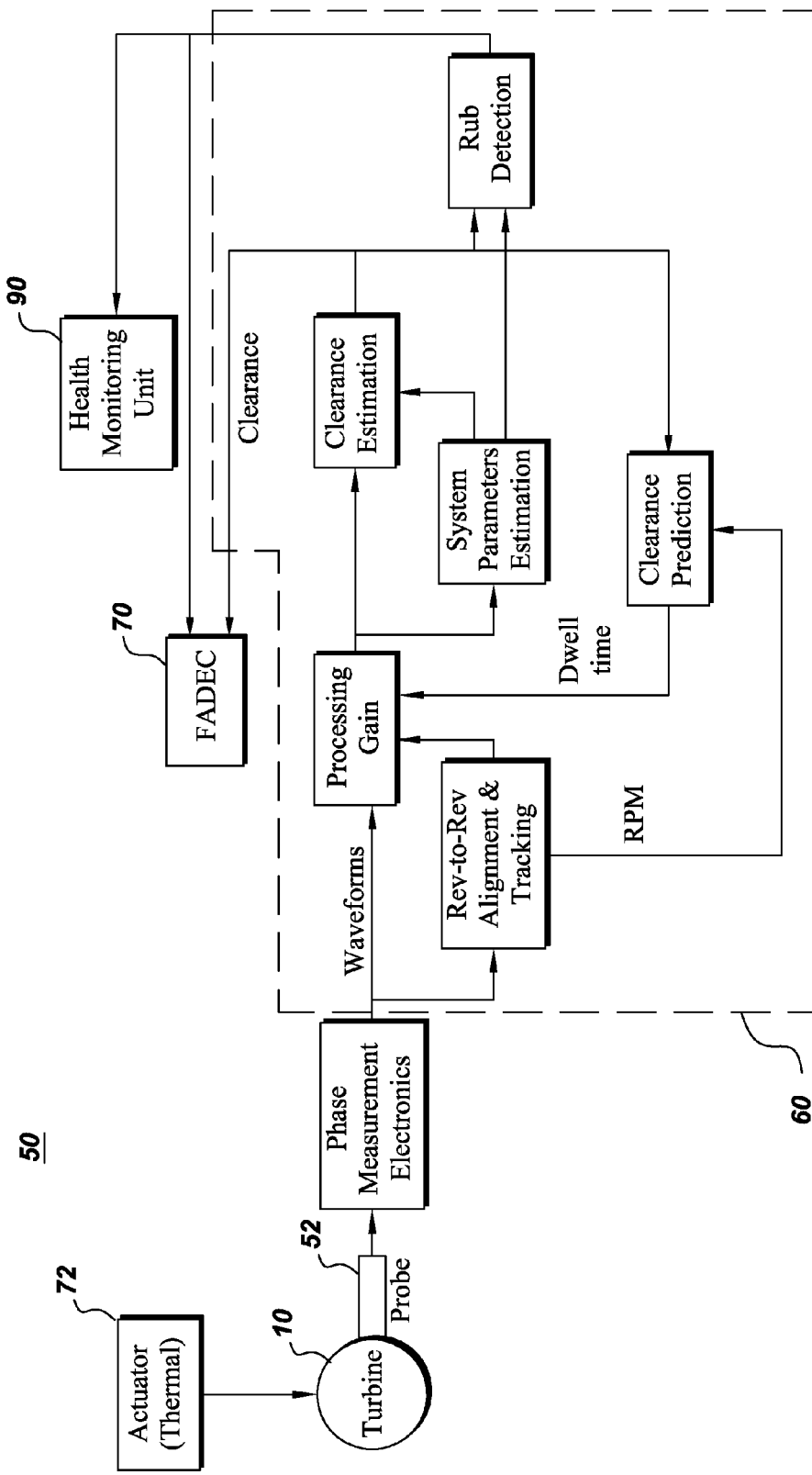
FIG. 3 is a block diagram illustrating a particular implementation of a rub detection system embodiment of the invention.

As indicated for example in FIG. 3, the rub detection system 50 includes at least one sensor 52 configured to generate signals representative of a sensed parameter corresponding to the rotating object(s) 20 at a plurality of times. The system 50 further includes a processor 60 configured to evaluate the signals to generate height h versus time data for the tip 22. As noted above with reference to FIG. 1, the height h of the tip 22 corresponds to the distance between the tip 22 and the shelf 24. The processor 60 is further configured to monitor the height h versus time data in order to determine whether a change in the height data exceeds a threshold value $h_{threshold}$, and to output a rub detection signal when the change in the height data exceeds the threshold value $h_{threshold}$. The rub detection system further includes a controller 70 configured to receive the rub detection signal. For the illustrated example, the controller 70 is a FADEC (full authority digital engine control system). In other non-limiting examples, the controller 70 is an (engine or blade) health monitoring system.

In one embodiment, the controller 70 is further configured to adjust the clearance between the rotating object(s) and a second object 30 in response to the control signal. More generally, for particular embodiments, the controller 70 is configured to adjust one or more engine parameters based at least in part on the rub detection. Non-limiting examples of engine parameters include bypass air bleed or compressor air bleed flow rates directed to impinge on the second object 30 to control its thermal growth, an electrical signal to mechanically adjust the radial position of shrouds mounted on the second object 30, or air pressures that may be used to mechanically adjust the position of the second object 30. In another embodiment, the rub detection system 50 further includes a health monitoring unit 90, which is configured to receive the rub detection signal and display one or more health indicators for the rotating object(s) 20 that include rub detection information.

Figure 4:
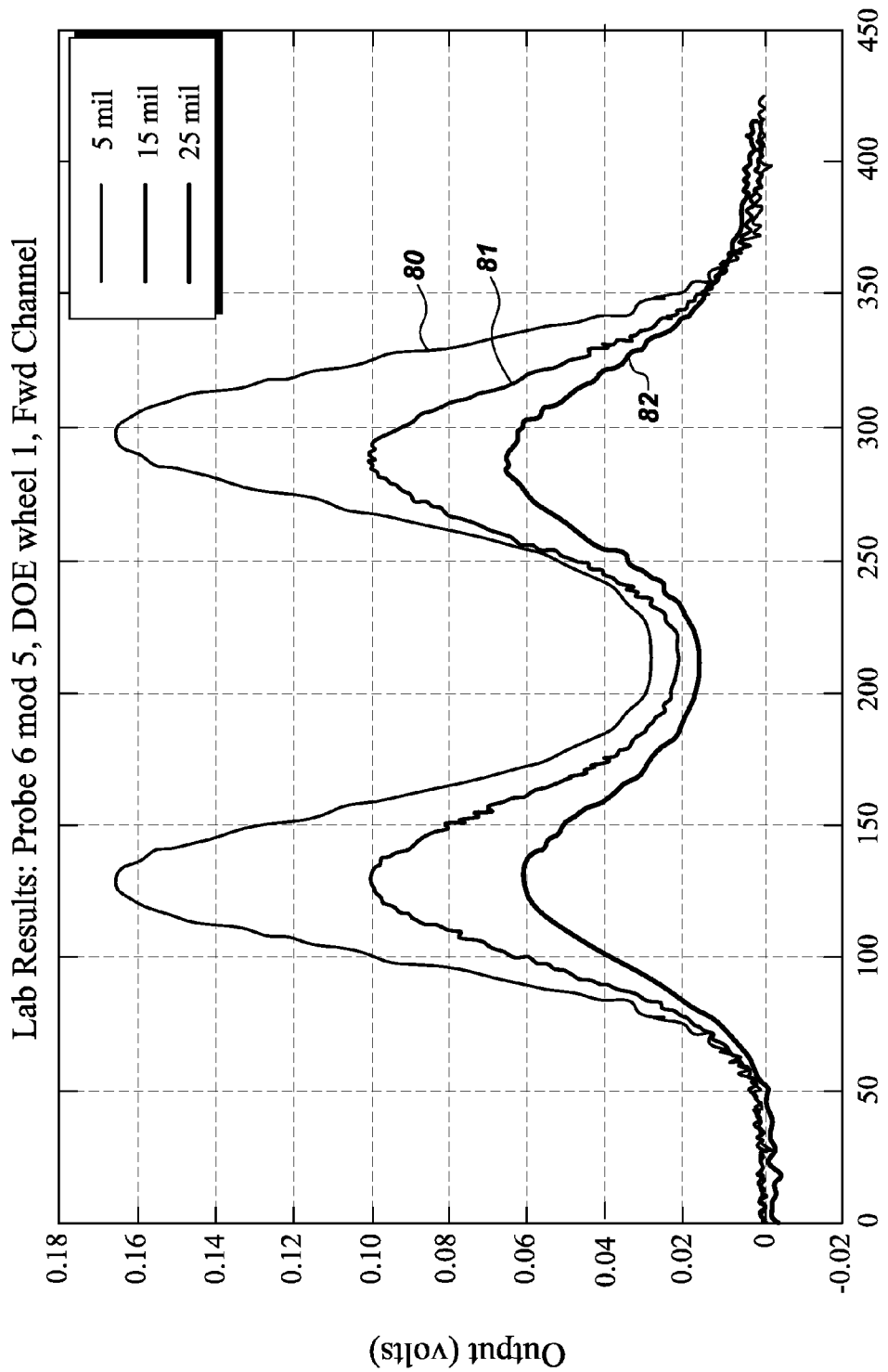
FIG. 4 shows example signal waveforms obtained using a capacitive sensor at different offsets for a turbine blade tip.

According to particular embodiments, the sensor(s) 52 comprises a capacitive sensor, and the sensed parameter comprises capacitance. The specific sensor configuration is not the subject of the present invention and will not be described in detail. It should be noted that the probe arrangement in FIG. 1, which shows a single probe with two offset probe tips 54, 56 is merely one possible arrangement. More generally, two or more separate single-head probes could be used, and the probes need not be co-located but rather could be spatially separated. In addition, the arrangement of FIG. 1 could be modified to employ a single, self-calibrated probe, as well. Specific arrangements of capacitive sensors are discussed for example, in commonly assigned US Published Patent Application US20060132147A1, Mahadevan Balasubramaniam et al, "SYSTEM AND METHOD FOR MEASURING CLEARANCE BETWEEN TWO OBJECTS" and in U.S. Pat. No. 7,215,129, Emad Andarawis et al., "Multitip clearance measurement system and method of operation." FIG. 4 shows sample waveforms 80, 81, 82 for a squealer tip 22 and shelf 24 taken using a capacitive probe. The three waveforms 80, 81, 82 were obtained at a 5 mil, a 15 mil and a 25 mil offset.

In a number of embodiments, the turbomachine 10 comprises a plurality of rotating objects 20. For example, the turbine engine 10 of FIG. 2 includes a number of turbine blades 20, and the stationary object 30 is a turbine case 30. For these embodiments, the sensor(s) 52 is (are) configured to generate signals corresponding to each of the rotating objects 20. Similarly, the processor 60 is configured to generate the height h versus time data for each of the tips of the rotating objects and to perform the monitoring for each of the rotating objects. For the embodiment in which the controller 70 is further configured to control the clearance in response to the rub detection signal(s), the controller 70 is configured to collectively adjust the clearance between the rotating objects 20 and the second object 30 in response to the control signal. For the example shown in FIG. 3, the controller 70 adjusts the clearance by sending one or more control signals to a (thermal) actuator 72, which in turn adjusts the clearance between the blades 20 and the casing 30 by thermal actuation. This is merely one example, and other types of actuators or adjustment schemes may be used to adjust the clearance.

Figure 2:
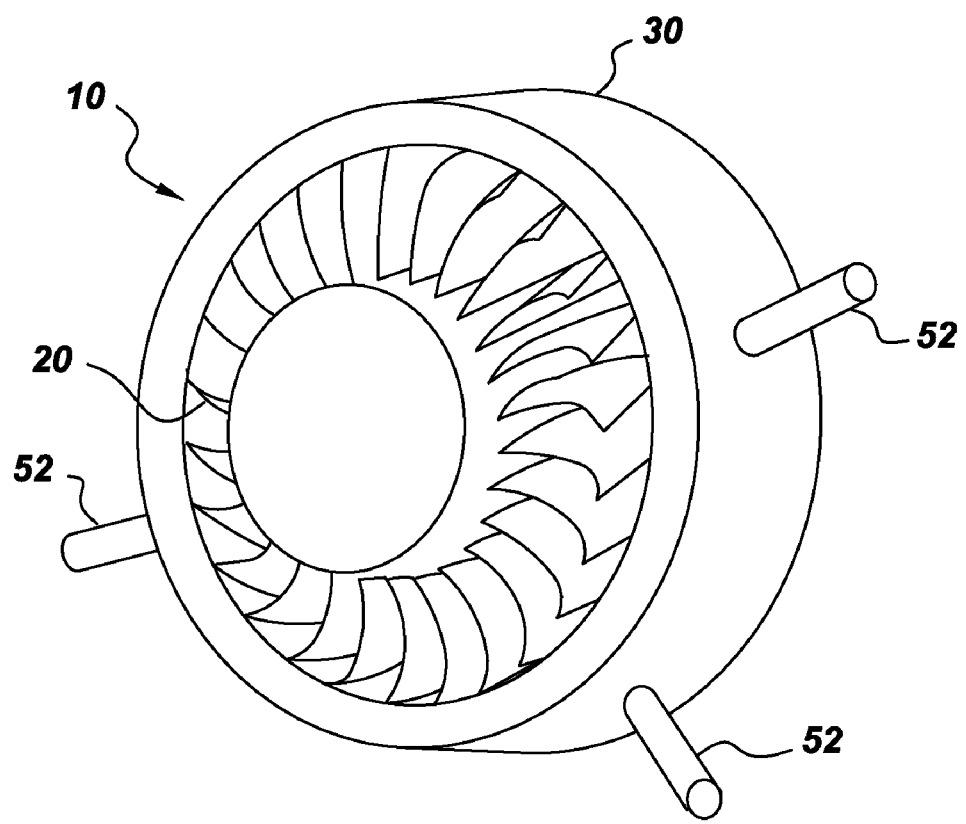
FIG. 2 illustrates an example arrangement of three clearance sensors mounted on a turbine engine.

For the sample sensor arrangement shown in FIG. 2, there are three sensors 52 used to monitor the clearance and tip height during operation of the turbomachine 10. In other applications, there may be 1, 2, 4 or other numbers of sensors 52 used to monitor the clearance and tip height.

Figure 9:
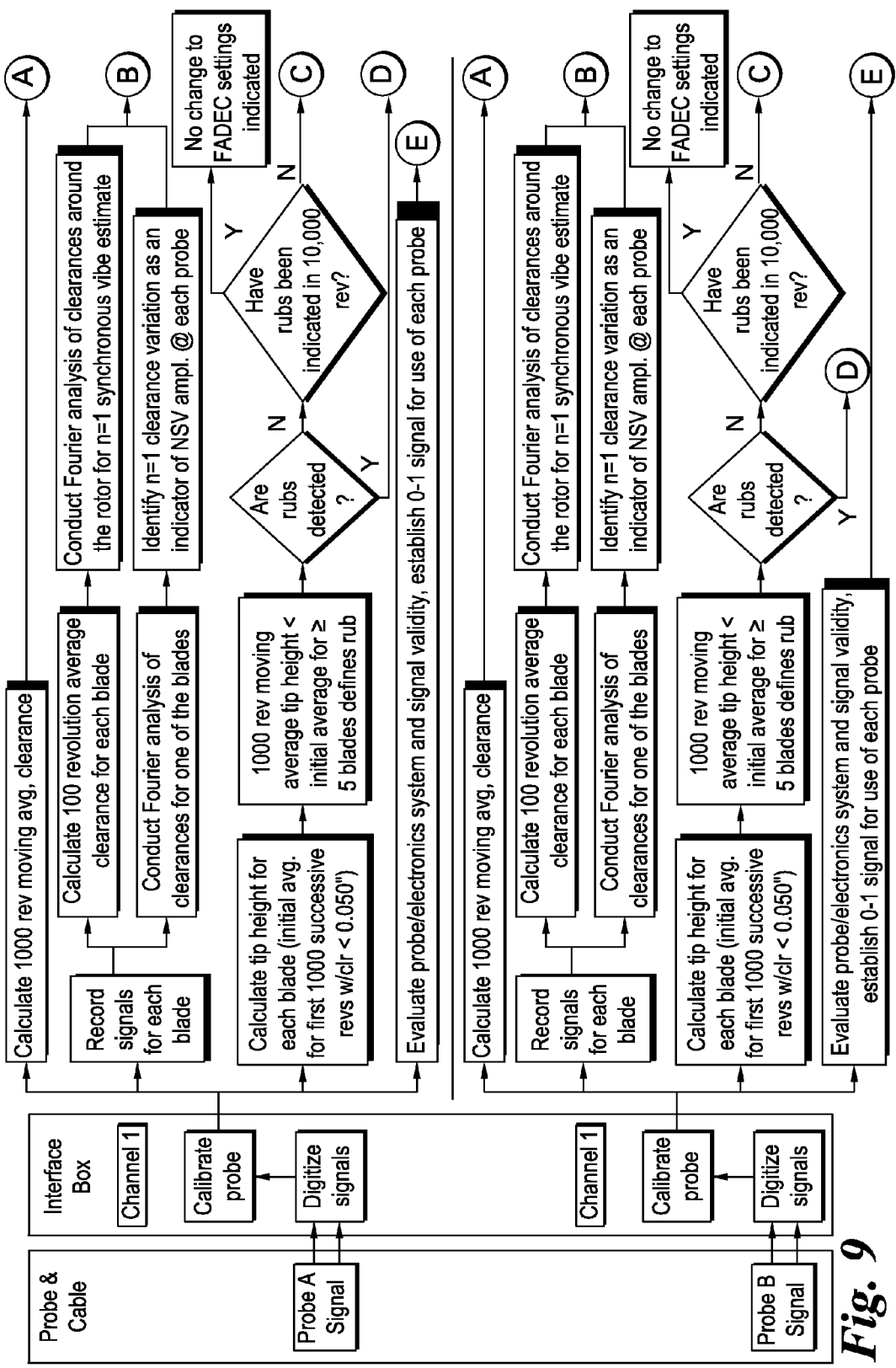
FIG. 9 is a logic flow chart for a closed loop turbine active clearance control application of the invention.

As discussed above and as illustrated, for example, by FIG. 2, in particular embodiments, each of the rotating objects 20 comprises a turbine blade 20, and the height h data correspond to squealer tip height h values. According to more particular embodiments, the threshold value $h_{threshold}$ is adaptive and varies as a function of the number of blades 20 over which a rub has occurred, such that the threshold value $h_{threshold}$ is higher where the squealer tip height h of only one of the blades 20 changes and conversely is lower where the squealer tip height h of at least two adjacent blades 20 changes over a defined time period. In many applications, the rotation speed is high (for example 12000-40000 rpm, depending on the application), and the data can be averaged over a number of revolutions, for example 1000 or 10,000, in a short time period, such that a fast response time can be maintained. It should further be noted that the 1000 and 10,000 blade averages indicated in FIG. 9 are merely examples, and in general any practical blade average can be used. Ideally, the average would be taken over the minimum number of revolutions to achieve a desired signal to noise ratio, while maintaining a fast response time. If the squealer tip height h of several adjacent blades 10 changes over 1000 (or 10,000 etc.) revolutions, it is more likely that a rub has occurred, than if the squealer tip height h of only one blade 20 (or of isolated blades 20) has occurred during the same time period. Accordingly, the threshold value $h_{threshold}$ at which a rub will be said to have occurred (such that corrective action may be taken to adjust the clearance between the blades 20 and the turbine casing 30) adapts to the number of adjacent blades experiencing a change in height h. Beneficially, this adaptive threshold increases sensitivity, while maintaining an acceptable false positive probability.

Sensitivity is further enhanced by varying the threshold value $h_{threshold}$ as an inverse function of the signal-to-noise ratio (SNR). Namely, the threshold value increases as the SNR decreases (poor SNR) and decreases as the SNR increases (good SNR). This adaptive threshold technique helps to avoid false positives when the SNR is poor and provides high sensitivity, and thus fast rub detection, in high SNR environments.

Figure 5:
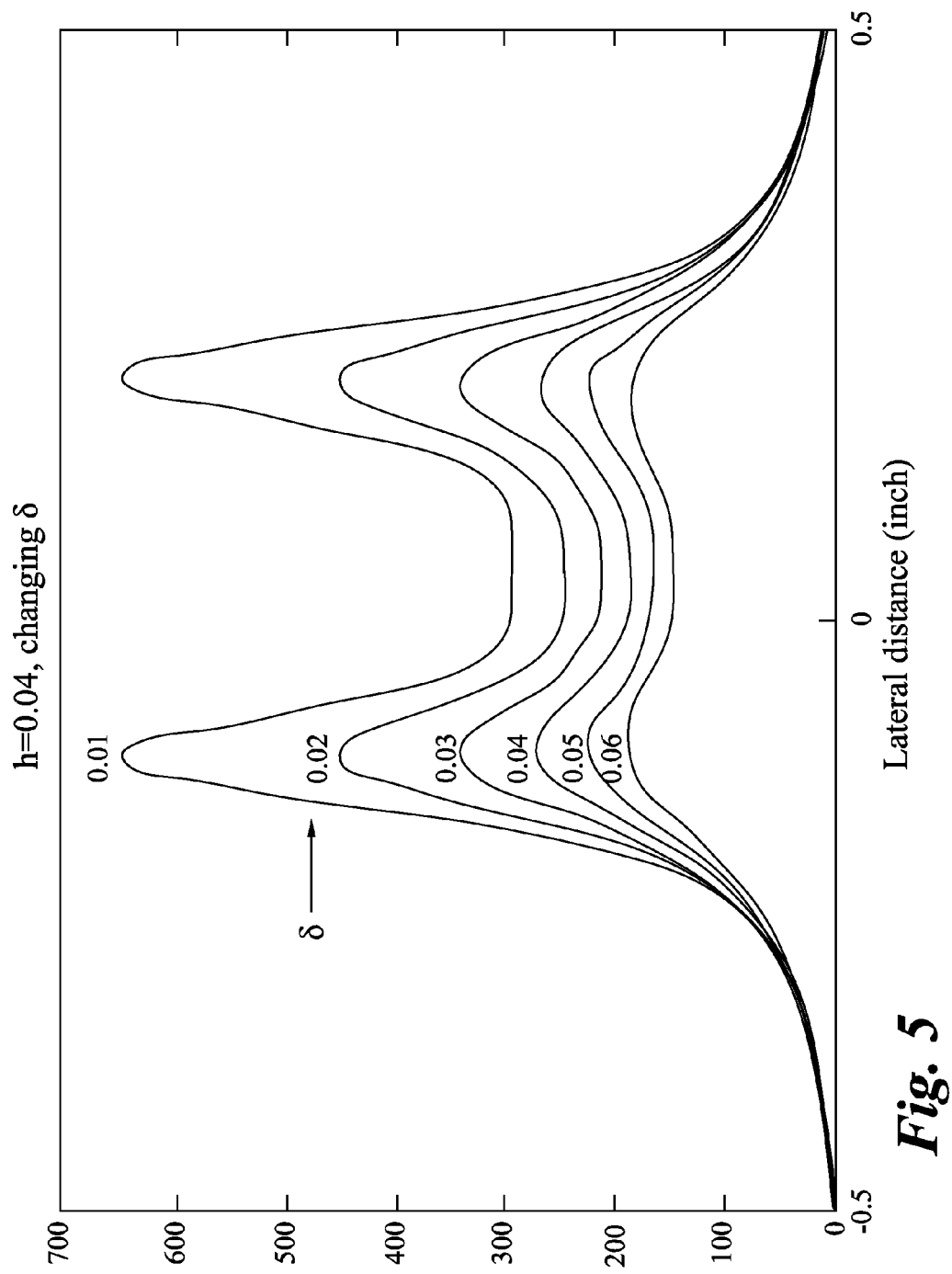
FIG. 5 shows example relative capacitance functions for a fixed value of h, with changing δ.
Figure 6:
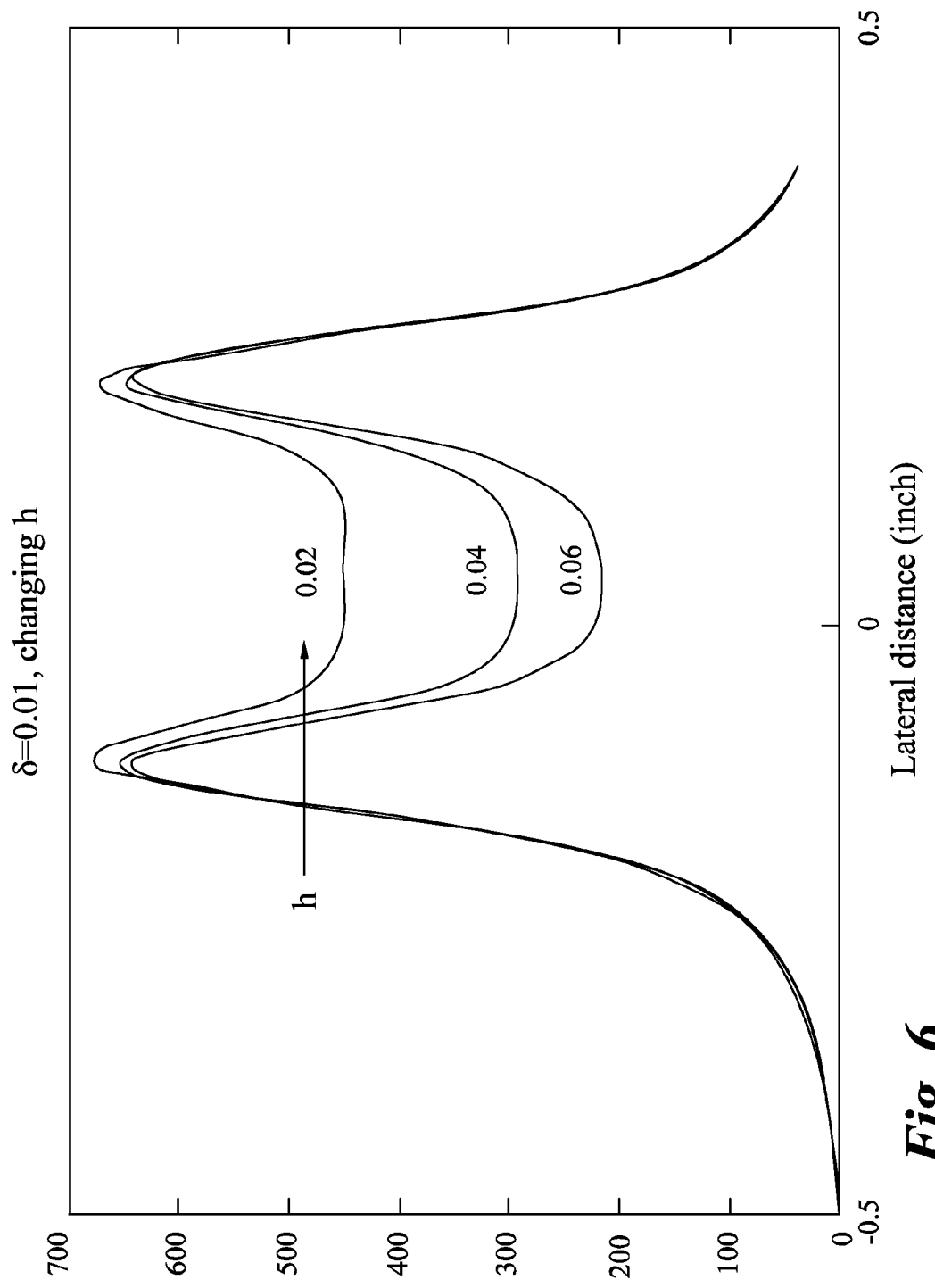
FIG. 6 shows example relative capacitance functions for a fixed value of δ, with changing h.
Figure 7:
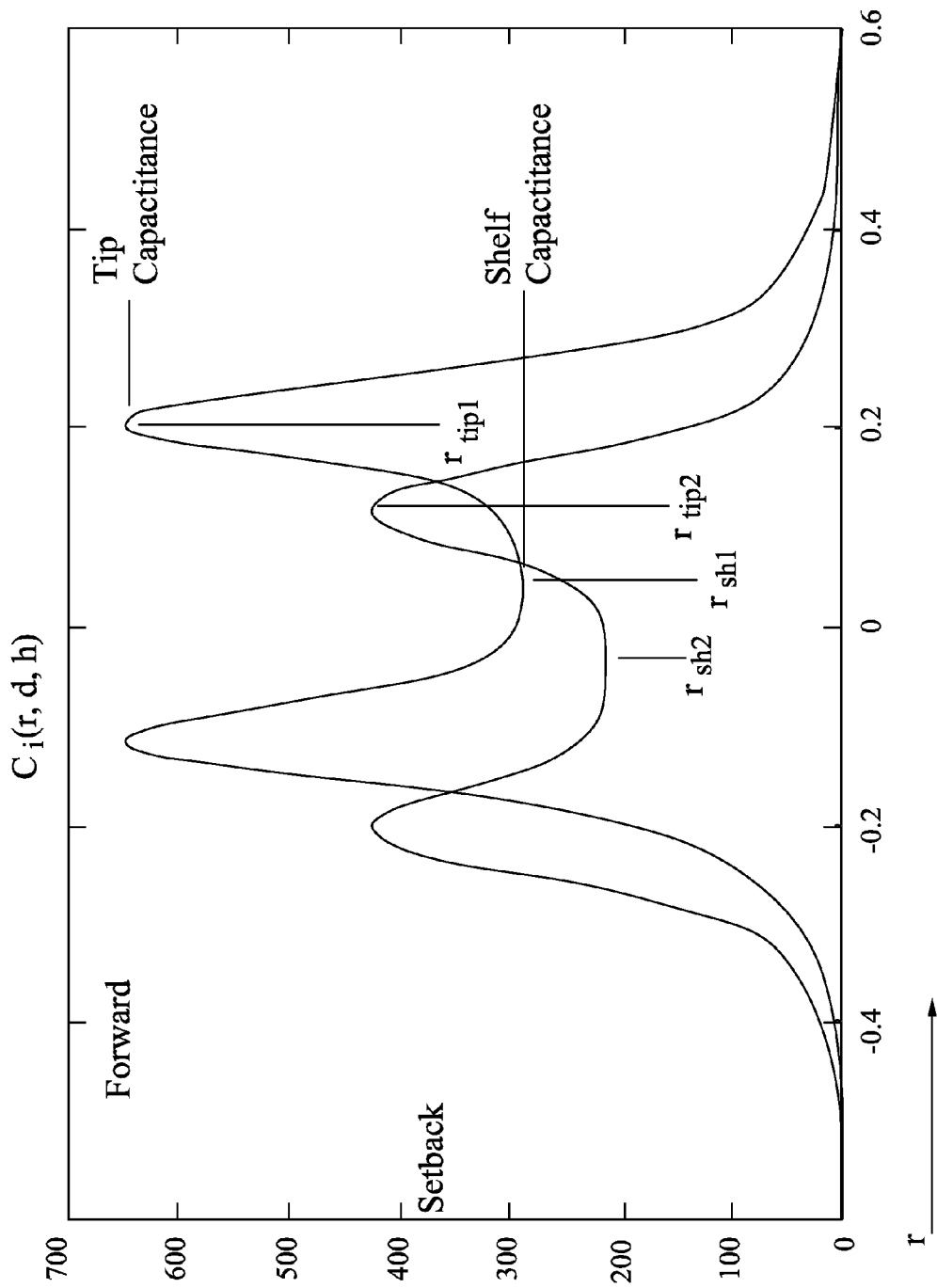
FIG. 7 illustrates example relative capacitance functions for a forward probe tip position and for a setback probe tip position.

For particular embodiments, the at least one signal obtained using sensor(s) 52 comprises a signal waveform 80, 81, 82, and the processor 60 is configured to perform an N-dimensional optimization operation on the signal waveform, where N is the number of data points selected from the signal waveform. As noted above, FIG. 4 shows three sample waveforms 80, 81, 82 taken using a capacitive sensor 52 for a blade tip 22. With a capacitance sensor what is measured is the capacitance seen by the sensor tip, with the blade present, relative to the capacitance seen by the sensor tip, when the blade has rotated past the sensor. These capacitance measurements are a function of circumferential, as well as radial distance between the sensor and the blade, plus significant blade dimensions, such as squealer height and, to a lesser extent, the wear on the squealer tips. A capacitive sensor 52 is characterized by the normalized relative capacitance:

$$\bar{C}_k(r,d,h) = C_k(r,d,h)/c_{refk}, \text{ and}$$

is further characterized by the reference capacitance:

$$c_{refk} = c_k(r_{tipk}, \delta_{ref} + d_p, h_{ref}),$$

where the channel number, k=1,2, and "d" is the radial distance between the sensor and the blade tip, as indicated in FIG. 1. Example relative capacitance functions are shown in FIGS. 5 and 6. FIG. 5 shows relative capacitance functions for a fixed value of h (h=0.04), for different values of δ, ranging from 0.01-0.06. FIG. 6 shows relative capacitance functions for a fixed value of δ (δ=0.01), for different values of h (0.02, 0.04 and 0.06). FIG. 7 illustrates relative capacitance functions for a forward probe tip position and for a setback probe tip position. FIG. 1 indicates a forward probe tip position and a setback probe tip position, with an example setback of 0.015 inches. This setback is merely an example, and the invention is not limited to specific probe positions or setbacks. As discussed above, the probe arrangement in FIG. 1 is merely one possible arrangement. More generally, two or more separate single-head probes could be used, and the probes need not be co-located but rather could be spatially separated. In addition, the arrangement of FIG. 1 could be modified to employ a single, self-calibrated probe, as well.

According to a more particular embodiment, a calibration function F for a single sensor tip (k=1) is defined as:

$$F(\delta, h, g_c) = g_c \begin{bmatrix} \bar{C}_1(r_{tip1}, \delta + d_p, h) \\ \bar{C}_1(r_{sh1}, \delta + d_p, h) \end{bmatrix}$$

and the N-dimensional optimization operation is performed by simultaneously solving the following equation for h and δ:

$$\begin{bmatrix} Vtip_1 \\ Vsh_1 \end{bmatrix} = F(\delta, h, g_c)$$

where $g_c$ is a system gain value, h is the squealer tip height, δ is a true clearance value, $d_p$ is an offset value, $C_1$ is a probe response, Vtip1 is a tip-to-base voltage, Vsh1 is a shelf-to-base voltage, and $rtip_1$ and $rsh_1$ are relative circumferential positions for the squealer tip 22 and the blade shelf 24. This optimization can be generalized by replacing $rtip_1$ and $rsh_1$ by $r_i$ and $r_j$, which are two relative circumferential blade positions, and by replacing Vtip1 and Vsh1 with the corresponding voltage values $V_i$ and $V_j$. In other words, the solution of the optimization problem is not limited to the specific points $rtip_1$ and $rsh_1$ (and corresponding voltage values Vtip1 and Vsh1) but rather can be solved using two or more points $r_i$ and $r_j$ (and the corresponding two or more voltage values $V_i$ and $V_j$).

Figure 8:
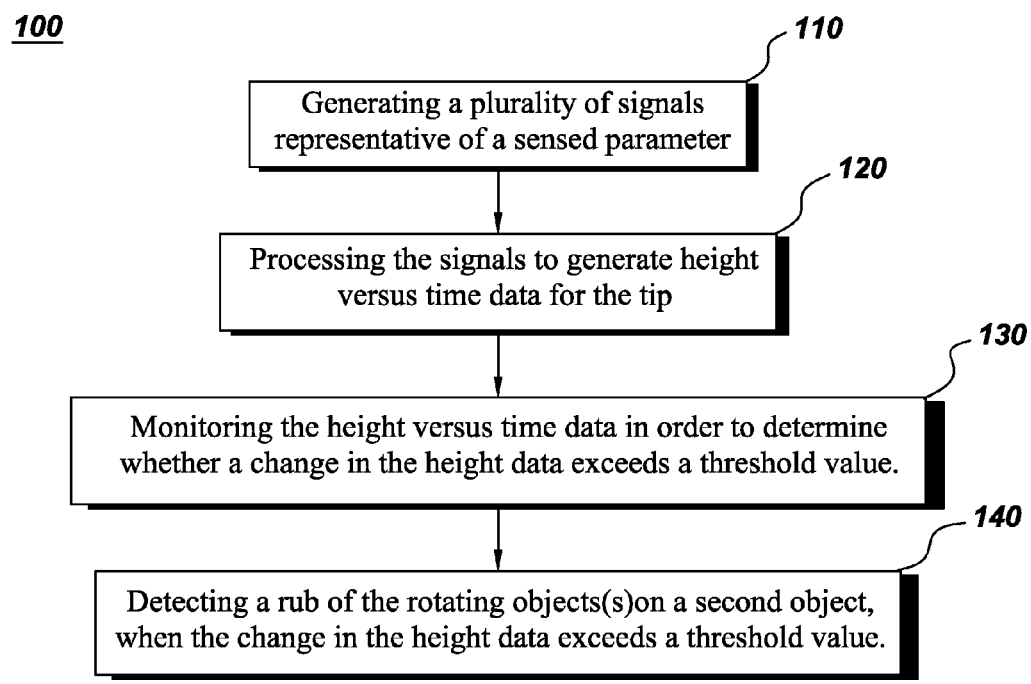
FIG. 8 is a flow chart for a rub detection method embodiment of the invention.

A method of detecting rubs during operation of a turbomachine 10 is described with reference to FIGS. 8, 9 and 11. As discussed above with reference to FIG. 1, the turbomachine 10 includes at least one rotating object 20 having a tip 22 and a shelf 24. FIG. 8 is a flow chart illustrating a clearance control method embodiment of the invention. As indicated in FIG. 8, the method 100 includes at step 110 generating signals representative of a sensed parameter. In particular embodiments, the sensed parameter is capacitance. The method further includes at step 120 processing the signals to generate height versus time data for the tip, where a height h of the tip corresponds to a distance between the tip and the shelf, as discussed above with reference to FIG. 1. The method further includes at step 130 monitoring the height h versus time data in order to determine whether a change in the height h data exceeds a threshold value $h_{threshold}$. The method further includes at step 140 detecting a rub of the rotating object(s) on a second object 30, when the change in the height data exceeds the threshold value $h_{threshold}$.

Figure 11:
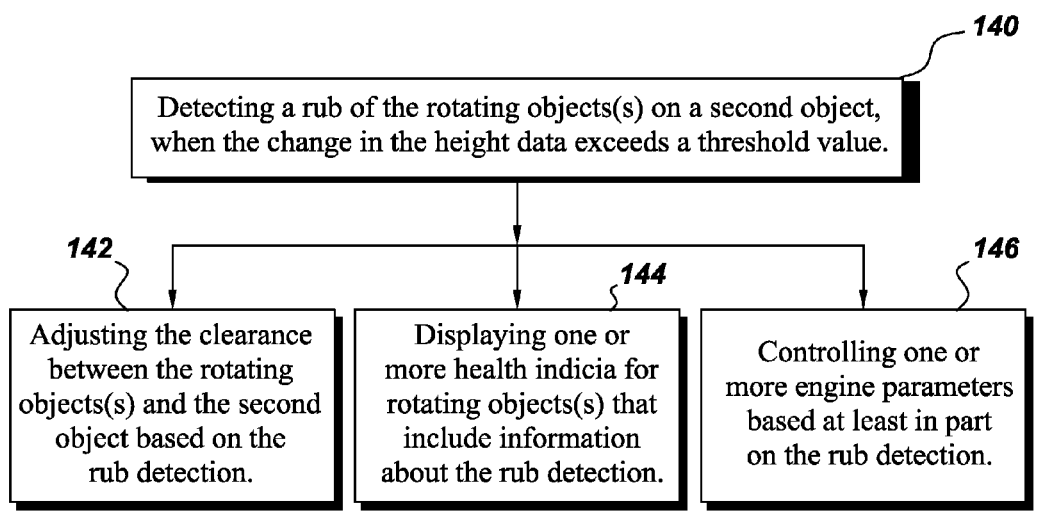
FIG. 11 is a flow chart illustrating three additional, optional steps for the method shown in FIG. 8.

As indicated for example in FIG. 11, the method further optionally includes at step 142 adjusting the clearance between the rotating object(s) 20 and the second object 30 based on the rub detection. At step 144, the method optionally includes displaying one or more health indicators for the rotating object(s) 20 that include information about the rub detection. At step 146, the method optionally includes controlling one or more engine parameters based at least in part on the rub detection. As noted above, non-limiting examples of engine parameters include case cooling or heating air flows (for example, valve positions for the cool and hot air that impinges on the stator) for controlling thermal growth, electrical signals to mechanically adjust static shroud positions, or cavity pressures to mechanically position the static member 30.

As discussed above with reference to FIG. 2, for a number of embodiments, the turbomachine 10 comprises a plurality of rotating objects 20. For example, the turbine engine 10 of FIG. 2 includes a number of turbine blades 20, and the stationary object 30 is a turbine case 30. For these embodiments, the generating, processing, monitoring and rub detection steps 110, 120, 130, 140 are performed for each of the rotating objects 20.

As discussed above and as illustrated, for example, by FIG. 2, in particular embodiments, each of the rotating objects 20 comprises a turbine blade 20, and the height h data correspond to squealer tip height h values. According to more particular embodiments, the threshold value $h_{threshold}$ is adaptive and varies as a function of the number of blades 20 over which a rub has occurred, such that the threshold value $h_{threshold}$ is higher where the squealer tip height h of only one of the blades 20 changes and conversely is lower where the squealer tip height h of at least two adjacent blades 20 changes over a defined time period. Beneficially, this adaptive threshold increases sensitivity, while maintaining an acceptable false positive probability.

As discussed above, sensitivity is further enhanced by varying the threshold value $h_{threshold}$ as an inverse function of the signal-to-noise ratio (SNR). Namely, the threshold value increases as the SNR decreases (poor SNR) and decreases as the SNR increases (good SNR). This adaptive threshold technique helps to avoid false positives when the SNR is poor and provides high sensitivity, and thus fast rub detection, in high SNR environments.

FIG. 9 is a logic flow chart for a closed loop, turbine active clearance control application of the invention. As noted above, one or more sensors 52 may be used to monitor the rotating parts 20. In the illustrated example, there are two sensors 52 (Probes A and B). For the illustrated example, the probe signals are digitized. Next, the tip height for each blade is calculated using the digitized signals. For the illustrated example, an initial average tip height for the first 1000 successive revolutions with a clearance of less than 0.050 inches is calculated. It should be noted that this example is illustrative and non-limiting. For the illustrated example, a rub is defined when a 1000 revolution moving average tip height is less than the initial average 1000 revolution tip height for five (5) or more blades. Next, it is determined whether a rub is detected. If yes, then a change to the FADEC settings is indicated, in order to open (or increase) the clearance. Upon clearance (removal) of a rub, it is desirable to delay closing (reducing) the clearance, in order to prevent the rub from starting again. Thus, it is next determined whether a rub is indicated in 10,000 revolutions. If no rub is indicated, then no change to the FADEC settings is indicated. In this example, the 10,000 revolution limit serves as a pause to avoid re-initiating the rub. If the rub has been cleared for 10,000 revolutions, then the controller 70 begins to increment back to the nominal FADEC schedule. In addition to the logic operations shown in FIG. 9, additional calculations and logic steps may then be performed at (A)-(E) to further determine whether to modify the FADEC settings, and if so, what the modifications should be.

The processing step 120 can be performed using a number of techniques. For particular embodiments, the at least one signal comprises a signal waveform 80, 81, 82 as indicated for example in FIG. 4, and the processing step 120 comprises performing an N-dimensional optimization operation on the signal waveform, where N is the number of data points selected from the signal waveform. According to a more particular embodiment, a calibration function F is defined as:

$$F(\delta, h, g_c) = g_c \begin{bmatrix} \overline{C}_1(r_{tip1}, \delta + d_p, h) \\ \overline{C}_1(r_{sh1}, \delta + d_p, h) \end{bmatrix}$$

and the N-dimensional optimization operation is performed by simultaneously solving the following equation for h and δ:

$$\begin{bmatrix} Vtip_1 \\ Vsh_1 \end{bmatrix} = F(\delta, h, g_c)$$

as discussed above. This optimization can be generalized by replacing $rtip_1$ and $rsh_1$ by $r_i$ and $r_j$, which are two relative circumferential blade positions, and by replacing Vtip1 and Vsh1 with the corresponding voltage values $V_i$ and $V_j$. In other words, the solution of the optimization problem is not limited to the specific points $rtip_1$ and $rsh_1$ (and corresponding voltage values Vtip1 and Vsh1) but rather can be solved using two points $r_i$ and $r_j$ (and the corresponding voltage values $V_i$ and $V_j$).

Figure 10:
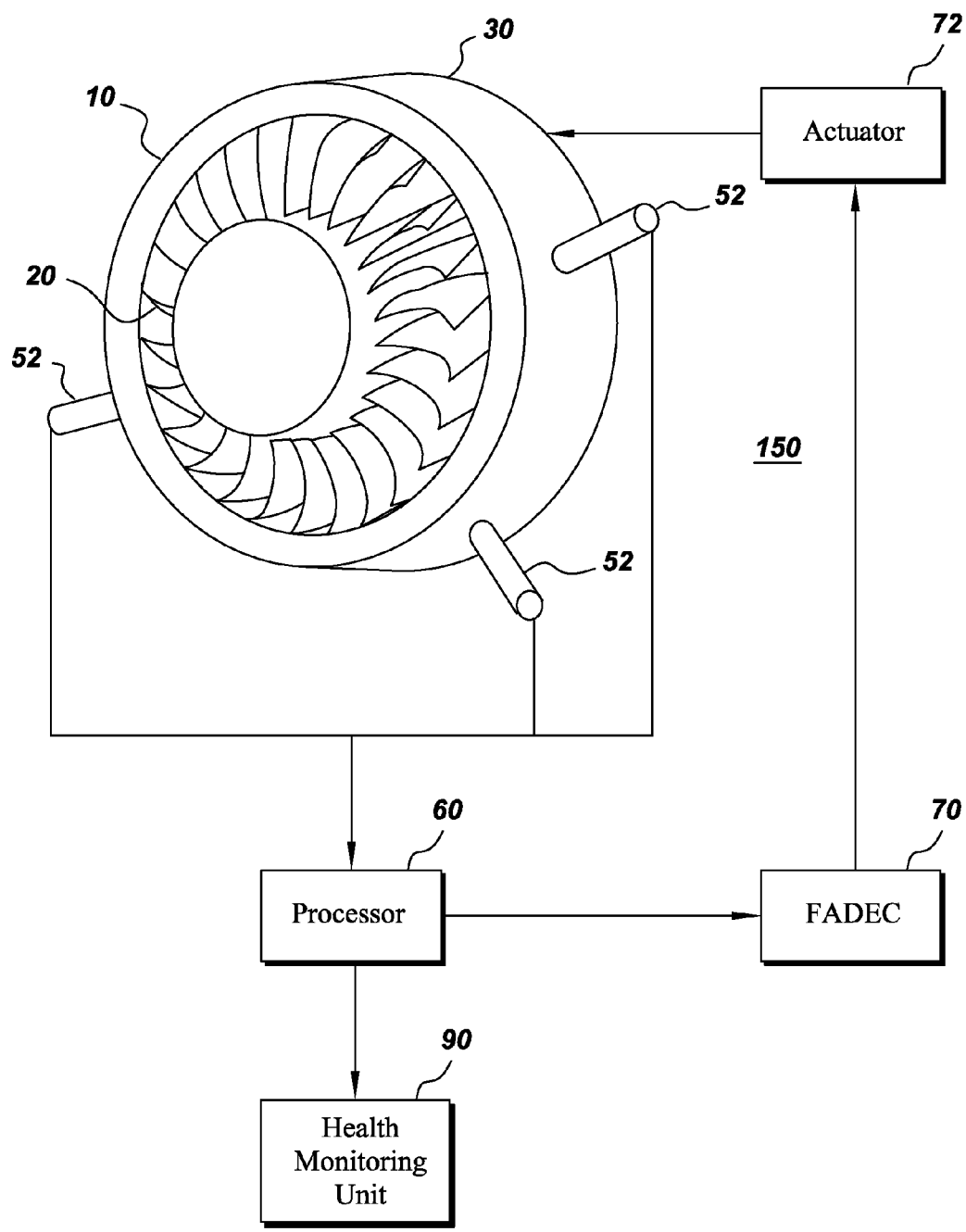
FIG. 10 illustrates a turbine engine system with rub detection.

A turbine engine system 150 with rub detection is described with reference to FIG. 10. As shown, for example, in FIG. 10, the turbine engine system 150 includes at least one rotating component 20 having a tip 22 and a shelf 24. Example rotating components 20 are discussed above with reference to FIG. 1. For the illustrated embodiment, the turbine engine system 150 includes a plurality of rotating components 20. The turbine engine system 150 further includes a stationary component 30 spaced apart from the rotating component(s) 20. At least one sensor 52 is configured to generate signals representative of a sensed parameter corresponding to the rotating object(s) at a plurality of times. As noted above, in particular embodiments, the sensor 52(s) comprises a capacitive sensor, and the sensed parameter is capacitance. As indicated in FIG. 10, the turbine engine system 150 further includes a processor 60 configured to evaluate the signals to generate height h versus time data for the tip, monitor the height versus time data in order to determine whether a change in the height data exceeds a threshold value $h_{threshold}$, and output a rub detection signal when the change in the height data exceeds the threshold value. As discussed above with reference to FIG. 1, the height h of the tip 22 corresponds to the distance between the tip 22 and the shelf 24. The turbine engine system 150 further includes a controller 70 configured to receive the rub detection signal. In particular embodiments, the controller 70 is further configured to adjust the clearance between the rotating object(s) 20 and a second object 30 in response to the control signal. One non-limiting example of the controller 70 is a FADEC. More generally, for certain embodiments, the controller is configured to control one or more engine parameters based at least in part on the rub detection signal. Sample logic for a control scheme using rub detection is discussed above with reference to FIG. 9. For the illustrated example, the turbine engine system 150 further includes an actuator 72, for example a thermal actuator, which receives the control signal from controller 70 and adjusts the clearance between the turbine case 30 and the turbine blades 20 in response to the control signal. In addition, for the illustrated embodiment, the turbine engine system 150 further includes a health monitoring unit for displaying one or more health indicators for the rotating part(s) 20, where the health indicators include information related to rub detection. Various other features, embodiments and implementations of turbine engine system 150 are discussed in detail above with reference to the rub detection system and method embodiments of the invention.

The above-described embodiments use spatially sensitive clearance sensor(s) that is (are) sensitive to blade shapes and then track the blade shapes as a function of time. Rub occurrence is thus determined based on blade shape changes, not just on clearance measurements. Beneficially, the invention is capable of detecting rubs that occur at points away from the location of the installed clearance sensor by means of tracking blade shape features and flagging changes that occur over time. In addition, the adaptive determination of rub detection thresholds based on SNR and measurement conditions enhances sensitivity. As a result, the above-described embodiments allow for the operation of a closed loop active clearance control system at a significantly reduced gap size. Since rubs are detected even when they occur away from the sensor location, the clearance can be kept small, thus improving the energy efficiency of the engine. In addition, since rubs are detected and flagged quickly, blade wear due to rubs can greatly be reduced. The sensor's ability to track squealer tip changes over time also enables blade health checking, and can trigger blade servicing at optimum times instead of preset intervals.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of detecting rubs during operation of a turbomachine comprising at least one rotating object having a tip and a shelf, the method comprising:
   generating a plurality of signals representative of a sensed parameter;
   processing the signals to generate a plurality of height versus time data for the tip, wherein a height of the tip corresponds to a distance between the tip and the shelf;
   monitoring the height versus time data in order to determine whether a change in the height data exceeds a threshold value; and
   detecting a rub of the at least one rotating object on a second object, when the change in the height data exceeds the threshold value.

2. The method of claim 1, further comprising adjusting the clearance between the at least one rotating object and the second object based on the rub detection.

3. The method of claim 1, further comprising displaying one or more health indicators for the at least one rotating object that include information about the rub detection.

4. The method of claim 1, further comprising controlling one or more engine parameters based at least in part on the rub detection.

5. The method of claim 1, wherein the turbomachine comprises a plurality of rotating objects, and wherein the generating, processing, monitoring and rub detection steps are performed for each of the rotating objects.

6. The method of claim 5, wherein each of the rotating objects comprises a turbine blade, and wherein the height data corresponds to squealer tip height values.

7. The method of claim 6, wherein the threshold value is adaptive and varies as a function of a number of blades over which a rub has occurred, such that a threshold value is higher where the squealer tip height of only one of the blades changes and conversely is lower where the squealer tip height of at least two adjacent blades changes over a defined time period.

8. The method of claim 7, wherein the threshold value further varies as an inverse function of the signal-to-noise ratio (SNR).

9. The method of claim 6, wherein each of the signals comprises a signal waveform, and wherein the processing comprises performing an N-dimensional optimization operation on the signal waveform, where N is the number of data points selected from the signal waveform.

10. The method of claim 9, wherein a calibration function is defined as:

$$F(\delta, h, g_c) = g_c \begin{bmatrix} \overline{C}_1(r_{tip1}, \delta + d_p, h) \\ \overline{C}_1(r_{sh1}, \delta + d_p, h) \end{bmatrix}$$

wherein performing the N-dimensional optimization operation comprises simultaneously solving an equation for h and $\delta$:

$$\begin{bmatrix} Vtip_1 \\ Vsh_1 \end{bmatrix} = F(\delta, h, g_c)$$

where $g_c$ is a system gain value, h is the squealer tip height, $\delta$ is a true clearance value, $d_p$ is an offset value, $C_1$ is a probe response, Vtip1 is a tip-to-base voltage, Vsh1 is a shelf-to-base voltage, and $rtip_1$ and $rsh_1$ are relative circumferential positions for the squealer tip and the blade shelf.

11. The method of claim 9, wherein a calibration function is defined as:

$$F(\delta, h, g_c) = g_c \begin{bmatrix} \overline{C}_1(r_i, \delta + d_p, h) \\ \overline{C}_1(r_j, \delta + d_p, h) \end{bmatrix}$$

wherein performing the N-dimensional optimization operation comprises simultaneously solving an equation for h and $\delta$:

$$\begin{bmatrix} Vi \\ Vj \end{bmatrix} = F(\delta, h, g_c)$$

wherein $g_c$ is a system gain value, h is the squealer tip height, $\delta$ is a true clearance value, $d_p$ is an offset value, $C_1$ is a probe response, wherein $r_i$ and $r_j$ are two relative circumferential blade positions, and wherein $V_i$ and $V_j$ are corresponding voltage values.

12. The method of claim 1, wherein the sensed parameter comprises a capacitance.

13. A rub detection system for a turbomachine comprising at least one rotating object having a tip and a shelf, the system comprising:
   at least one sensor configured to generate a plurality of signals representative of a sensed parameter corresponding to the at least one rotating object at a plurality of times;
   a processor configured to:
      evaluate the signals to generate a plurality of height versus time data for the tip, wherein a height of the tip corresponds to a distance between the tip and the shelf,
      monitor the height versus time data in order to determine whether a change in the height data exceeds a threshold value, and
      output a rub detection signal when the change in the height data exceeds the threshold value; and
   a controller configured to receive the rub detection signal.

14. The rub detection system of claim 13, wherein the controller is further configured to adjust the clearance between the at least one rotating object and a second object in response to the rub detection signal.

15. The rub detection system of claim 13, wherein the controller is further configured to control one or more engine parameters based at least in part on the rub detection signal.

16. The rub detection system of claim 13 further comprising a health monitoring unit configured to receive the rub detection signal and display one or more health indicators for the at least one rotating object that includes rub detection information.

17. The rub detection system of claim 13, wherein the turbomachine comprises a plurality of rotating objects,
   wherein the at least one sensor is configured to generate signals corresponding to each of the rotating objects, and
   wherein the processor is configured to generate the height versus time data for each of the tips of the rotating objects and to perform the monitoring for each of the rotating objects.

18. The rub detection system of claim 17, wherein each of the rotating objects comprises a turbine blade, and wherein the height data correspond to squealer tip height values, and
wherein the threshold value is adaptive and varies as a function of a number of blades over which a rub has occurred, such that a threshold value is higher where the squealer tip height of only one of the blades changes and conversely is lower where the squealer tip height of at least two adjacent blades changes over a defined time period.

19. The rub detection system of claim 17, wherein each of the rotating objects comprises a turbine blade, and wherein the height data correspond to squealer tip height values, and
wherein the threshold value varies as an inverse function of the signal-to-noise ratio (SNR).

20. The rub detection system of claim 17, wherein each of the rotating objects comprises a turbine blade, and wherein the height data correspond to squealer tip height values, and wherein the at least one signal comprises a signal waveform, and wherein the processor is configured to perform an N-dimensional optimization operation on the signal waveform, where N is the number of data points selected from the signal waveform.

21. The rub detection system of claim 13, wherein the at least one sensor comprises a self-calibrated capacitive sensor, and wherein the sensed parameter comprises a capacitance.

22. The rub detection system of claim 13, wherein the at least one sensor comprises capacitive sensor with a first sensor tip and a second sensor tip, wherein the first and the second sensor tips are set back from one another, and wherein the sensed parameter comprises a capacitance.

23. A turbine engine system with rub detection, the turbine engine system comprising:
a plurality of rotating components, each rotating component having a tip and a shelf;
a stationary component spaced apart from the rotating components;
at least one sensor configured to generate a plurality of signals representative of a sensed parameter corresponding to the rotating components at a plurality of times;
a processor configured to:
evaluate the signals to generate a plurality of height versus time data for the tip, wherein a height of the tip corresponds to a distance between the tip and the shelf,
monitor the height versus time data in order to determine whether a change in the height data exceeds a threshold value, and
output a rub detection signal when the change in the height data exceeds the threshold value; and
a controller configured to receive the rub detection signal.

24. The turbine engine system of claim 23, wherein the controller is further configured to control one or more engine parameters based at least in part on the rub detection signal.

25. The turbine engine system of claim 23, wherein each of the rotating components comprises a turbine blade, and wherein the height data correspond to squealer tip height values, and
wherein the threshold value is adaptive and varies as a function of a number of blades over which a rub has occurred, such that a threshold value is higher where the squealer tip height of only one of the blades changes and conversely is lower where the squealer tip height of at least two adjacent blades changes over a defined time period.

26. The turbine engine system of claim 23, wherein each of the rotating components comprises a turbine blade, and wherein the height data correspond to squealer tip height values, and
wherein the threshold value varies as an inverse function of the signal-to-noise ratio (SNR).

27. The turbine engine system of claim 23, wherein the at least one sensor comprises a self-calibrated capacitive sensor, and wherein the sensed parameter comprises a capacitance.

28. The turbine engine system of claim 23, wherein the at least one sensor comprises a capacitive sensor with a first sensor tip and a second sensor tip, wherein the first and the second sensor tips are set back from one another, and wherein the sensed parameter comprises a capacitance.

* * * * *